H. A. BALLARD.
SHOE SEWING MACHINE.
APPLICATION FILED AUG. 30, 1904.

1,103,732.

Patented July 14, 1914.
7 SHEETS—SHEET 1.

Witnesses:
Rollin Abell
C. C. Stecher

Inventor:
Harrie A. Ballard
by Wright Brown Quinby
his Attys.

H. A. BALLARD.
SHOE SEWING MACHINE.
APPLICATION FILED AUG. 30, 1904.

1,103,732.

Patented July 14, 1914.
7 SHEETS—SHEET 2.

H. A. BALLARD.
SHOE SEWING MACHINE.
APPLICATION FILED AUG. 30, 1904.

1,103,732.

Patented July 14, 1914.
7 SHEETS—SHEET 6.

Witnesses:
Rollin Abell.
C. C. Stecher.

Inventor:
Harrie A. Ballard
By Wright Brown Quinby
Attys.

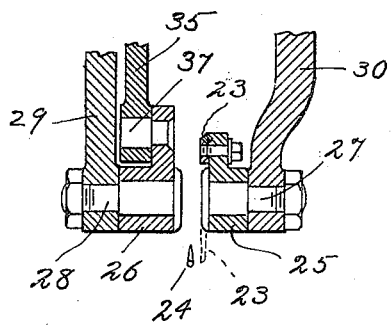
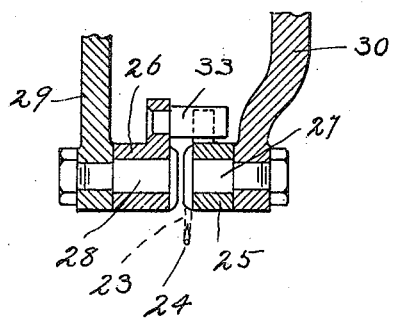
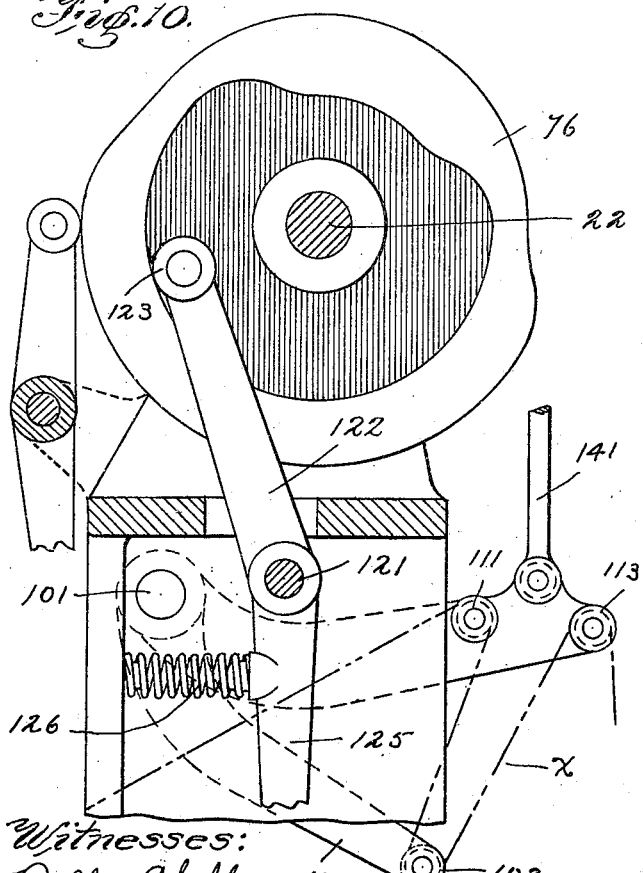
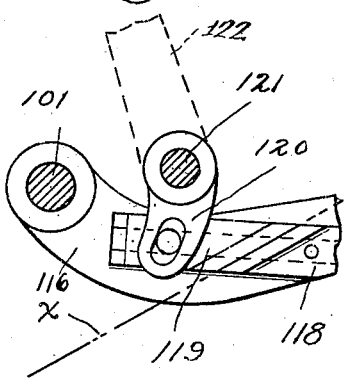

UNITED STATES PATENT OFFICE.

HARRIE A. BALLARD, OF ASHLAND, MASSACHUSETTS, ASSIGNOR, BY MESNE ASSIGNMENTS, TO THE BOYLSTON MANUFACTURING COMPANY, OF BOSTON, MASSACHUSETTS, A CORPORATION OF NEW JERSEY.

SHOE-SEWING MACHINE.

1,103,732.     Specification of Letters Patent.     Patented July 14, 1914.

Application filed August 30, 1904. Serial No. 222,691.

*To all whom it may concern:*

Be it known that I, HARRIE A. BALLARD, of Ashland, in the county of Middlesex and State of Massachusetts, have invented certain new and useful Improvements in Shoe-Sewing Machines, of which the following is a specification.

This invention has relation to lock-stitch shoe-sewing machines.

The invention has for its primary object the provision of a simple, compact and powerful sewing-machine, and to this end consists of certain improvements which are illustrated in the accompanying drawings, described in the following specification, and pointed out with particularity in the appended claims.

Figure 1:
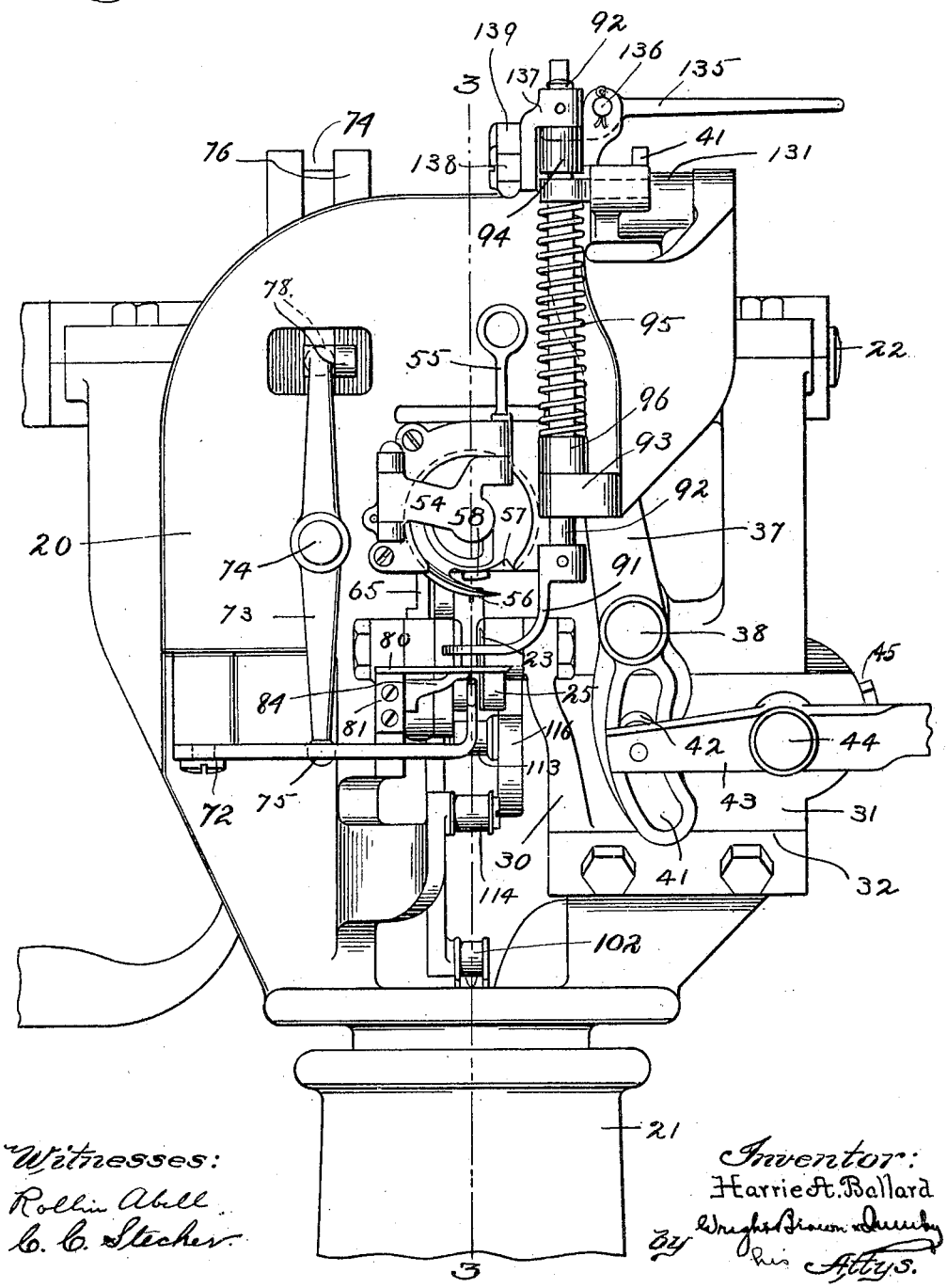
Figure 2:
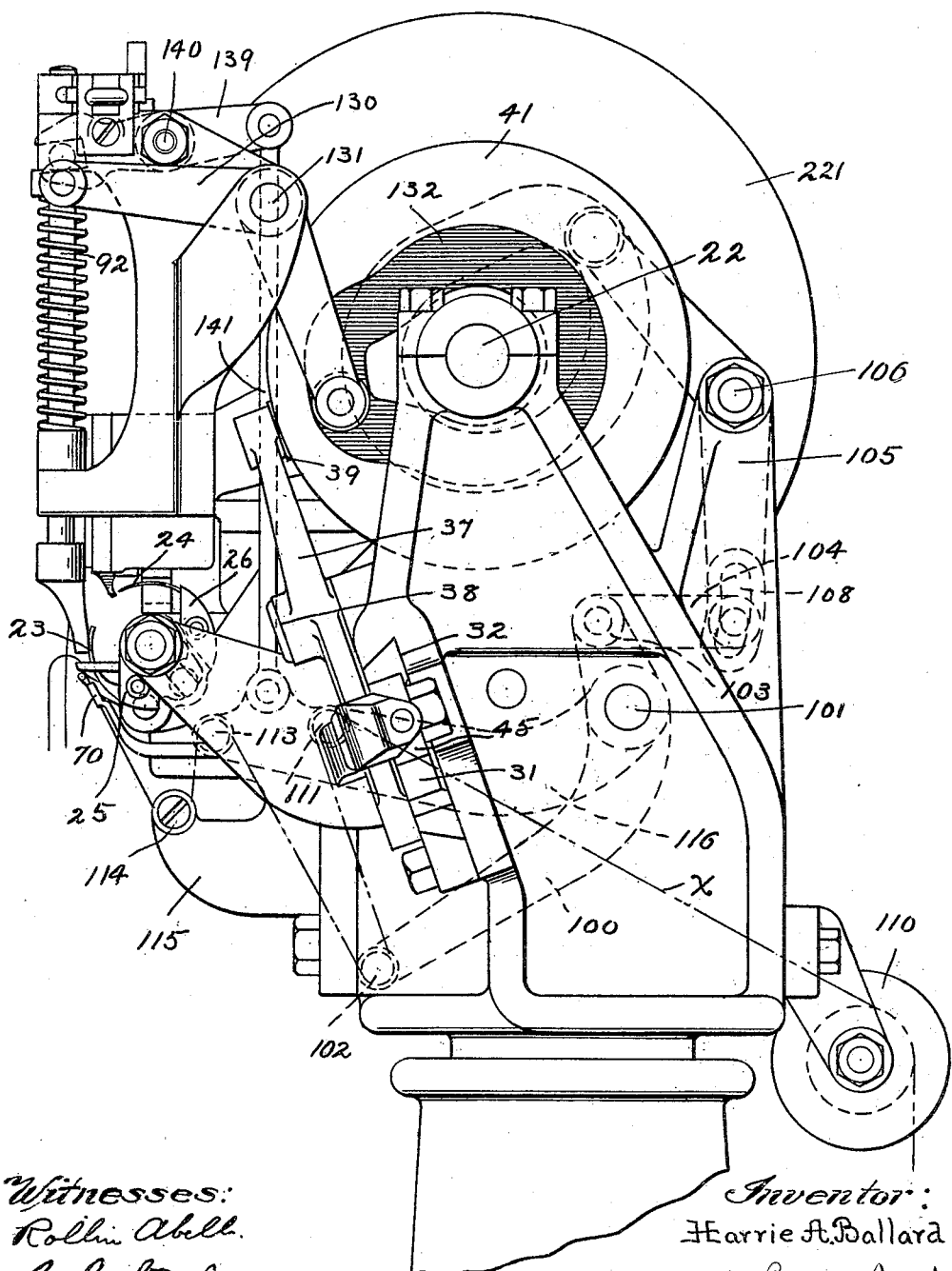
Figure 3:
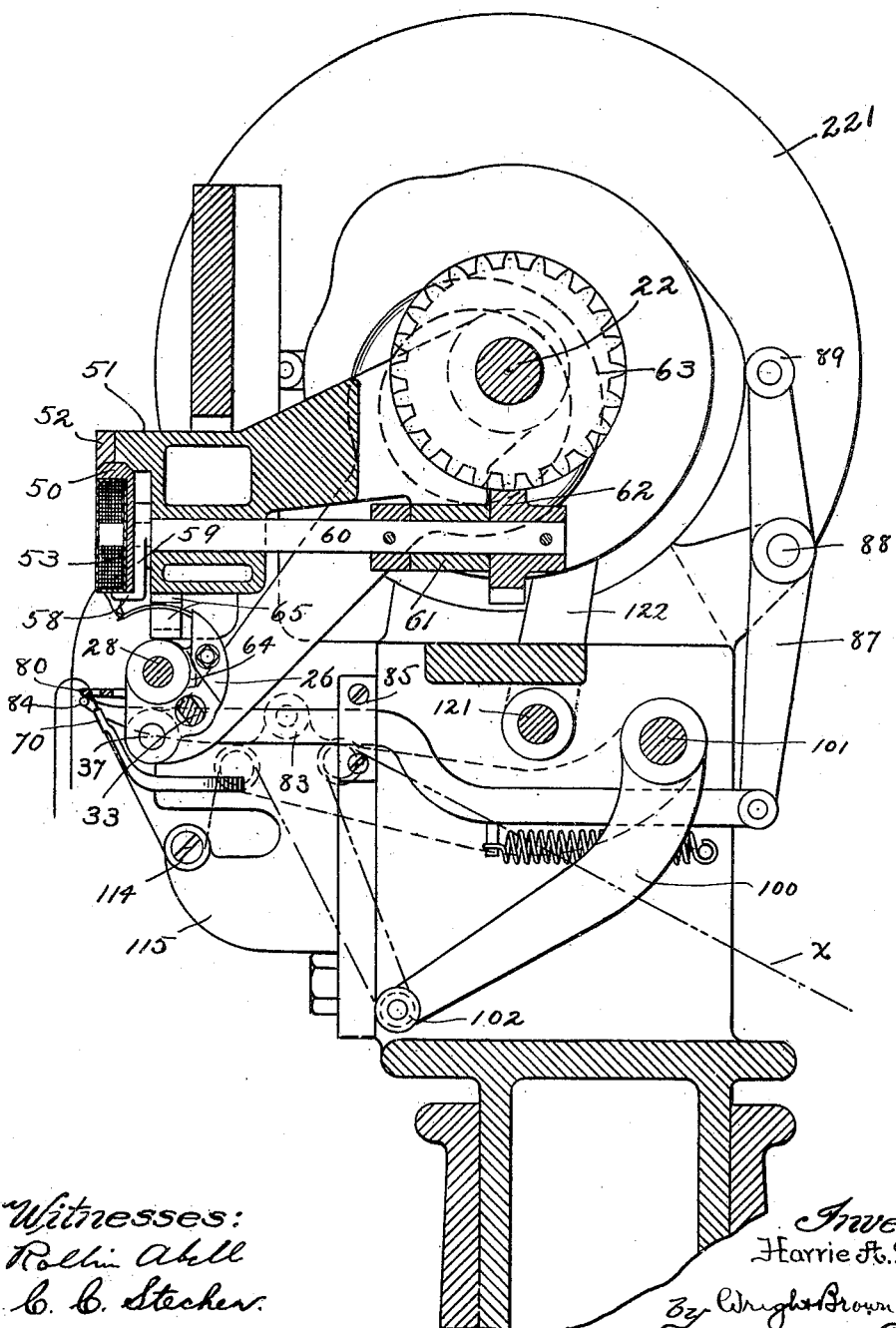
Figure 4:
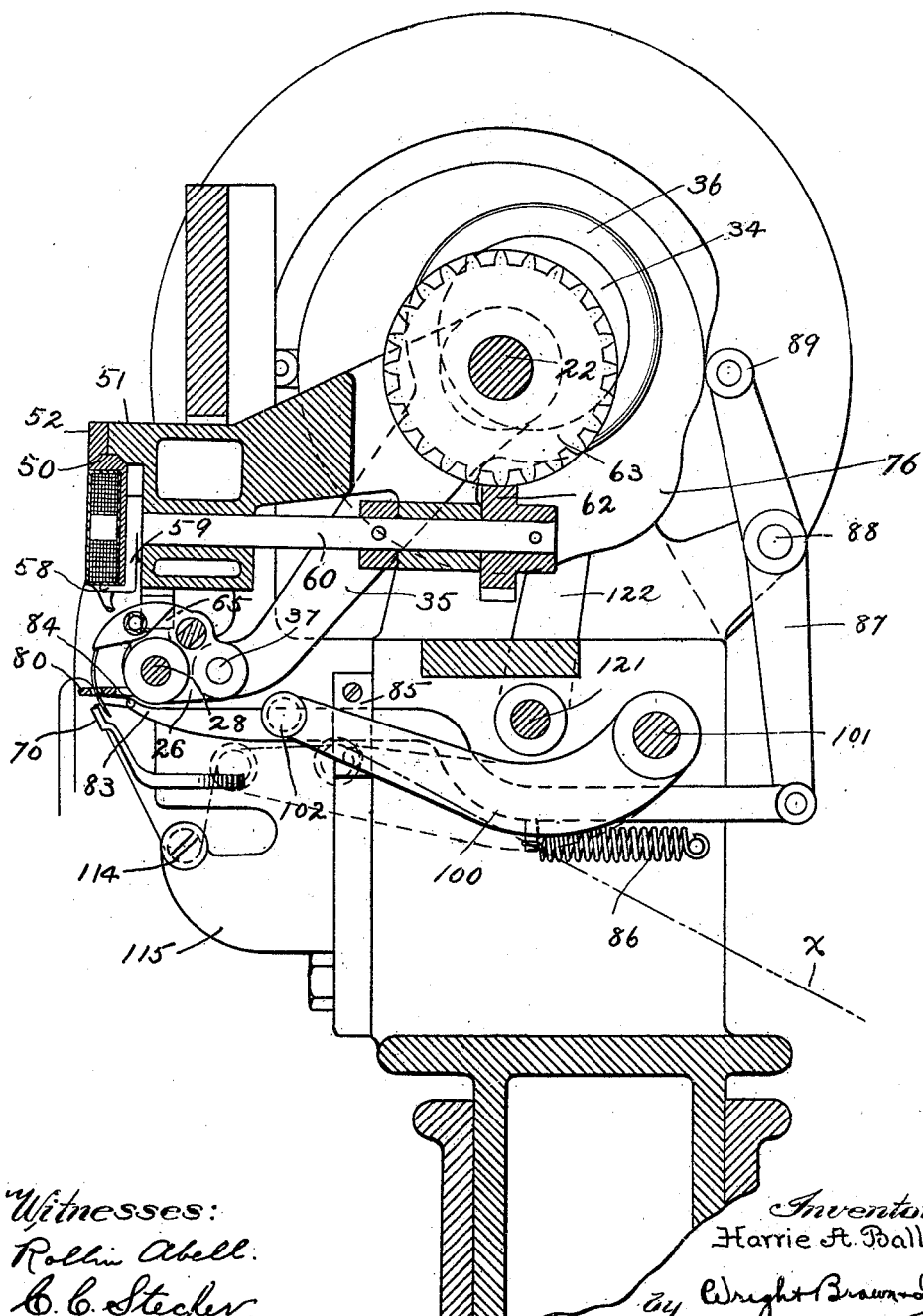
Figure 5:
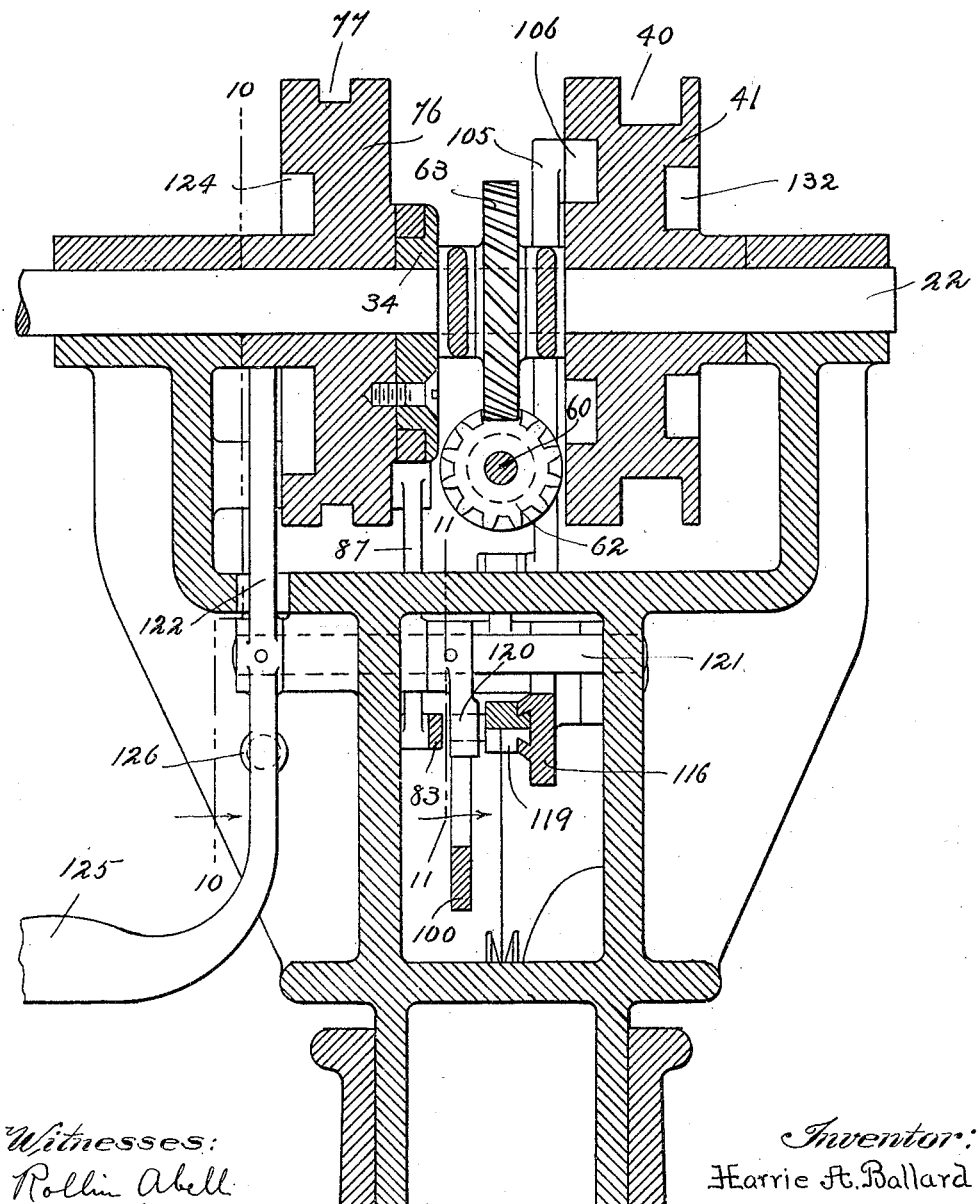
Figure 6:
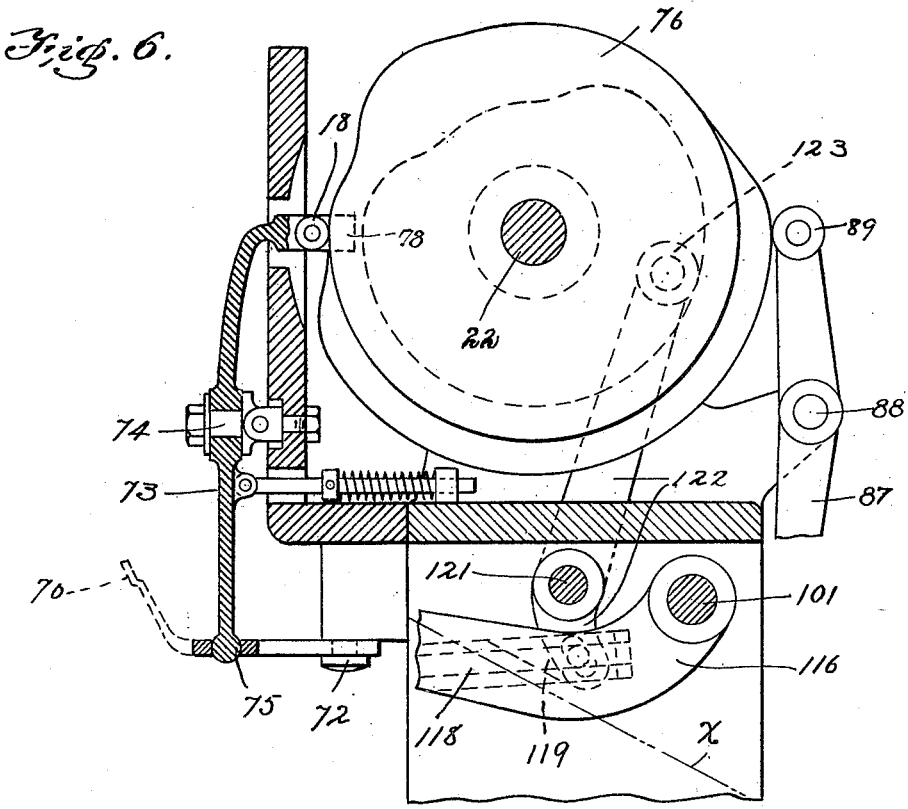
Figure 7:
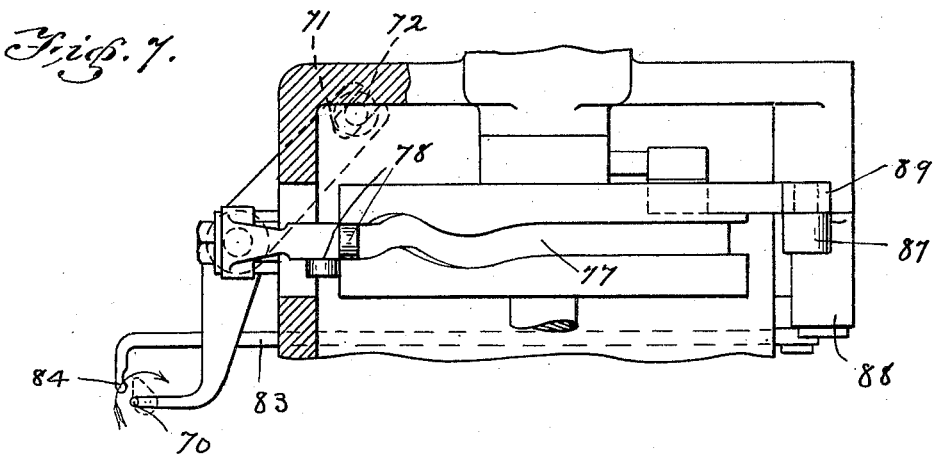

Of the drawings:—Figure 1 represents a front elevation of a shoe-sewing machine embodying the invention. Fig. 2 represents a side elevation of the same. Fig. 3 represents a section on the line 3—3 of Fig. 1. Fig. 4 represents a similar section and shows the parts in the different positions. Fig. 5 represents a vertical section taken longitudinally through the cam-shaft. Figs. 6 and 7 represent the looper, and the means for actuating the same, and Fig. 6 also illustrates a portion of the thread-lock. Figs. 8 and 9 represent sections through the supports upon which are journaled the needle-carrier and the awl-carrier. Fig. 10 illustrates the take-up mechanism. Fig. 11 illustrates the thread-locking mechanism.

On the drawings:—The head including a frame 20 is supported upon the usual standard 21, and it is provided with bearings for the main shaft 22, by which all of the operative parts of the machine are actuated. The said shaft 22 is driven in the usual way by a belt-wheel 221, located upon the end thereof.

I will first describe the stitch-forming mechanism, comprising the awl, the needle, the looper, the thread-finger, the shuttle, and their actuating mechanisms. The awl 23 and needle 24 are of the curved variety, and they are respectively supported upon carriers 25 and 26 which are adapted to oscillate about the same axis, although they are mounted upon separate studs which are indicated at 27 28 in Figs. 8 and 9. The two studs are placed in axial alinement, the said stud 28 being secured in the stationary arm or member 29 projecting forwardly from the frame, and forming a rigid part thereof. The stud 27, on the contrary, is secured in an arm or movable member 30 which projects forwardly and upwardly from a slide 31 which, as shown in Figs. 1 and 2, is adapted to reciprocate in the guideway 32, formed in the front portion of the head. This slide is actuated, by means which will be subsequently described, for the purpose of moving the awl laterally and thereby imparting a step-by-step feeding movement to the work. A single mechanism is employed for oscillating the carriers for the awl and needle, and consequently said carriers are connected so that an oscillatory movement given to one is synchronously imparted to the other. This connection consists of a pin 33 secured to the needle-carrier 26, and entering a notch or aperture in the awl-carrier, said pin lying parallel to the axis of movement of said carriers, as best shown in Fig. 9.

The carriers are actuated from the main shaft 22 by an eccentric motion which includes an eccentric 34 secured to said shaft 22 and a connecting rod 35 having at one end a strap 36 passing around said eccentric and being pivotally connected at its other end, as at 37, with the needle-carrier 26. By virtue of this construction, a complete rotation of the shaft 22 effects a complete oscillation of both the needle and awl. By the employment of the eccentric, the movements imparted to the awl and the needle are even and positive in both directions, and power is transmitted in the most direct manner to the awl and the needle, thus precluding lost motion between the parts. The needle and awl are placed in the usual way, so that they project in opposite directions, their ends being separated a distance greater than the thickness of the work; and by the mechanism which I shall explain, the awl penetrates the work when it is out of alinement with the needle and when said awl withdraws from the work, the needle penetrates the aperture left by the awl, the awl having in the meantime fed the work one step. The lateral movement of the awl may be easily secured by the employment of an intermediately-fulcrumed lever 37, operated by a cam on the shaft 22. The said lever is fulcrumed on a stud 38, projecting forwardly from the frame, and on its upper end carries a roll 39, which lies in a cam-path 40 in a cam-disk 41, secured upon the shaft 22. The cam-path is so formed that at the proper time the slide 31 is moved to effect a lateral movement of the awl, either into alinement with the needle or out of alinement therewith, so as to either move the shoe along or else return to its initial position to again penetrate the work.

In order that the length of the feeding movement of the shoe may be varied, the lower end of the lever 37 is formed with an eccentric slot 41, into which projects a roll 42 on a lever 43 fulcrumed at 44 on the slide 31. On its rear face the lever 43 carries a friction-shoe 45, which bears against the curved end of the slide and holds the lever against accidental movement.

The shuttle is indicated at 50, and it is supported by a movable shuttle-carrier 51. It is held in place in the carrier by a removable gib 52, which with the end of the arm forms a shuttle race. The shuttle is of the rotary discoidal type and it is open for the reception of the bobbin 53, said bobbin being held in place by a keeper 54, hinged to the shuttle-carrier and adapted to be locked in position by a pin 55. The shuttle is formed with the loop-engaging hook 56 and with separated shoulders forming a notch 57, into which extends the end 58 of a shuttle-driving arm 59. The shuttle-carrier 51 is yoke-shaped at its rear end and it is pivoted upon the shaft 22, so that its free end which carries the shuttle is adapted to be moved up and down with relation to the needle and the awl. For rotating the shuttle, the arm 59 is secured upon a shaft 60 whose rear end is journaled in a depending projection 61 on the shuttle-carrier. On the rear end of the shaft a spirally-toothed pinion 62 is intermeshed with and driven by a spiral toothed gear 63, located on the shaft 22 in the yoke of the shuttle-carrier 51. The gears are of such relative diameter and the pitch of their teeth is such that the shuttle is rotated twice for each rotation of the main shaft. The shuttle is located somewhat in advance of the studs 27 and 28, which support the needle- and awl- carriers, so that when the needle is in its uppermost position, and is holding a loop of thread, the shuttle will be rotated to cause its hook to engage the loop and carry it around the shuttle, to lay the shuttle-thread in the loop. Inasmuch as the shuttle makes two complete rotations for each single complete oscillation of the needle, mechanism is provided whereby on each second or alternate rotation of the shuttle, the shuttle-carrier will be raised so as to move the shuttle to an inactive position, where it will not interfere with the needle-carrier or the awl. To this end the needle-carrier 26 is provided with a cam-projection 64 adapted to engage a lug 65 on the under portion of the shuttle-carrier, so as to raise it, when the needle moves forward toward the work, and to hold it raised until the needle returns from the work with the loop of thread. By virtue of this construction, the needle-thread is passed around the looper with great rapidity, giving an abundance of time for setting the stitch and permitting the other parts of the machine to fully accomplish their proper functions at the desired times.

The looper is indicated at 70. It is located in position to place a loop of needle-thread around the hook of the needle when the latter has been projected through the work. At its rear end the looper is slotted as at 71, to receive a pin or stud 72 which is passed vertically upward into a convenient portion of the head. By this pin and slot connection, the looper is adapted to be oscillated, and at the same time to be moved longitudinally so that its end or thread-carrying portion may be caused to circumscribe a circle about the needle. The said looper is positively actuated by means of a lever 73 which is supported by a universal joint 74 attached to the front of the head. The lower end of the lever is connected by a ball and socket joint 75. The lever is oscillated about its angular axes by a cam-disk 76. Said disk is provided in its periphery with a cam-path 77, into which the end of the lever 73 projects, and it is also formed on its periphery with cam rises and depressions to engage rolls 78 78 on the upper end of said lever. The said lever projects through the front of the head so as to reach the cam-disk 76, as best shown in Fig. 1. With this construction, the looper is directly actuated by simple and durable means to lay the thread about the barb of the needle. Immediately above the end of the looper is a work-support 80, consisting of a plate connected by a suitable bracket 81 with the front of the head. The plate is slotted for the passage of the needle and the awl. The work is held against and guided by this work-support in the usual manner. Immediately below the work-support is a thread-finger (so called) which serves to draw out from the looper a certain amount of thread so that substantially the middle portion of the loop is laid in the barb of the needle, for the prevention of chafing of the thread. This thread-finger is indicated at 83, and it is hooked at its end as at 84, so as to properly engage the thread. It is slidingly mounted in a support 85 and is normally retracted by a spring 86, as shown in Fig. 4. After the thread has been laid upon the needle by the looper, the finger is advanced to release the thread by a lever 87 which is fulcrumed in the rear of the head, as at 88, and which is provided at its upper end with a roll 89 to engage the periphery of the cam-disk 76 to the left of the groove 77. This portion of the periphery of the disk is so formed that, at the proper instant, the thread-finger is moved forward to the position shown in Fig. 3, after which it is permitted to be retracted by the spring 86 to the position shown in Fig. 4.

The take-up mechanism, which is interposed between the looper and the source of thread-supply, comprises the arm 100. This arm is rigidly secured to a rock-shaft 101, journaled in suitable bearings in the head and carries on its end a thread-guide 102 which in this case may consist of a roll loosely journaled on a pin projecting laterally from the arm. The shaft 101 is rocked to vibrate the arm by cam-actuated mechanism. In Fig. 2, it will be seen that secured to the rock-shaft 101 is a short arm 103 which is connected by a link 104 with a lever 105 fulcrumed between its ends by the stud 106. The upper end of the lever 105 is shown in Fig. 5 as being equipped with, on its end, a roll, which projects into a cam-path 106, on the inner face of the cam-disk 41. The lower end of the lever 105 is formed with the eccentric slot 108 for the adjustable connection of the link 104 thereto, in consequence of which the movement of the free end of the arm 100 may be varied, as desired.

From the source of supply and the wax-pot (not shown), the thread, which is indicated at x, passes over an idler or truck 110, over a thread-guide 111, thence down and around the thread-guide 102 on the arm 100, thence up and over another thread-guide 113, thence downwardly under the thread-guide 114, and upward to the looper 70. The thread-guide 114 consists preferably of a roll journaled on a pin projecting laterally from a bracket 115 affixed to the front of the head. The two thread-guides 111 and 113 are likewise rolls, and they are journaled upon pins projecting from an arm or movable support 116 which is pivoted upon the rock-shaft 101, as best indicated in Fig. 2. The said guides 111 and 113 are spaced apart and are at such distances from the shaft 101 that the thread-guide 102 is adapted to pass between them, as shown in Fig. 4. The means for moving the support 116, to vary the amount of thread taken up, will be subsequently explained.

The lock for the needle-thread is on the support 116, and it consists of two clamping members, of which one is stationary to serve as an abutment, and of which the other is movable, as I will now explain. On the inner face of the support 116, as shown in Fig. 6, is a stationary member or abutment 118, the end of which is parallel to the course of the thread, but oblique to the longitudinal median line of the support 116. The said support is grooved to receive a movable clamping member 119 whose inner end or face is complemental to the end or face of the member 118, so as to firmly grip the needle-thread between them. The movable member 119 is cam-actuated. It has a pin and slot connection with an arm 120, secured to a rock-shaft 121, journaled in the head, as shown in Fig. 5. On the projecting end of said shaft is a lever 122, which carries on its end a roll 123 which engages an internal cam 124 in the face of the cam-disk 76. The lower end of the lever 122 is bent laterally at 125, so that the operator may manually rock the shaft 121, so as to move the member 119 away from the member 118, and thus release the needle-thread. A spring 126 normally holds the roll 123 against the internal cam-face of the disk 76, whereby the two locking members are normally held together by spring-pressure, but are separated by the action of the cam.

For the purpose of holding the work upon the work-support 80, I employ a presser-foot mechanism comprising a presser-foot 91 which is secured upon a bar 92, vertically movable in guides 93 94 on the front face of the head. The presser-foot is held yieldingly against the work by a helical spring 95. For automatically raising the presser-foot, to permit the feeding of the work, the bar 92 is connected with an angle-lever 130 fulcrumed at 131, which carries upon its end a roll lying in a cam-path 132 in the front face of the cam-disk 44. The rotation of the cam effects the lifting of the presser-foot at the proper time. When the awl is about to feed the work, and as soon as the awl has ceased its lateral movement, and before the needle penetrates the work, the presser foot is permitted to descend at once to again engage the work and hold it against movement. In order that the operator may simultaneously lift the presser-foot from the work, and loosen the needle-thread, a single lever is utilized, and devices are provided for connecting said lever with both the presser-foot bar 92 and the support 116.

By referring to Figs. 1 and 2, it is there shown that a lever 135 is fulcrumed at 136 on the top of the head. The shorter end of the lever projects under a collar 137 which is attached to the upper end of the presser-foot bar 92. Said collar has a projecting pin 138 which extends into the slotted end of a lever 139, fulcrumed between its ends at 140 and connected by a rod 141 with the support 116. By virtue of this construction, the operator in depressing the long end of the lever 135 lifts the presser-foot bar 92 and at the same time rocks down the support 116, so as to bring the thread-guides 111 113 nearer to the take-up guide 102 and the stationary guide 114, so as to slacken the thread and permit the operator to draw a certain amount of it through the looper 70.

The connection between the presser-foot mechanism and the support 116 for the thread-guides provides for the length of thread taken up and released by the take-up 100 to be proportional with the thickness of the work. This feature, however, is of no particular moment in the invention.

It is unnecessary to describe the operation of the machine as a whole, more than to state that the cams which are conventionally shown upon the drawings are properly timed to cause the various mechanisms to operate in proper predetermined order. The shoe is held by the workman with the projecting edge of the sole between the work-support 80 and the presser-foot, the presser-foot at this time being raised by the operator to permit the insertion of the sole. The operator then returns the lever 135 to initial normal position. The awl penetrates the work and moves the work one step, the presser-foot at this time being raised to permit the feeding movement. The needle descends through the aperture made in the work by the awl until its barb projects below the work, immediately upon which the thread-finger, having been actuated to draw out a short length of the thread, (the thread-lock being open at this time, and the take-up being raised,) and the looper lays the loop of needle-thread around the barb of said needle, and the needle is then withdrawn from the work, drawing up the loop into such position that it may be engaged by the hook on the shuttle. As soon as the shuttle has laid the shuttle-thread in the needle-thread loop, the thread-lock is closed, and the take-up is actuated to set the stitch, the thread finger in the meantime having been moved forward so as to release the needle-thread, this forward movement of the finger taking place as the needle moves upward through the work. It has been explained that the shuttle rotates twice for each complete oscillation of the needle, so that it will be understood that while the needle is moving forward, to enter the aperture in the work, the shuttle-carrier is raised, whereby the shuttle may rotate without coming into contact with the needle.

Having thus explained the nature of the invention, and described a way of constructing and using the same, although without attempting to set forth all of the forms in which it may be made, or all of the modes, of its use, I declare that what I claim is:—

1. A sewing machine of the character described, comprising an oscillatory curved awl, an oscillatory curved needle, carriers for said awl and said needle connected to move in synchronism, independent pivots for said carriers arranged in axial alinement, means for oscillating said carriers, independent supports for said pivots, a power shaft for actuating said means, and means actuated by said shaft for moving one of said pivots axially relatively to the other independently of the oscillatory movement of said carriers.

2. A sewing machine of the character described, comprising an oscillatory curved awl, an oscillatory curved needle, independent oscillatory carriers for said awl and needle, a pivot for the needle carrier, a stationary support for said pivot, a laterally movable slide, a pivot supported thereon in axial alinement with the first-mentioned pivot, an awl carrier journaled on said second-mentioned pivot, one of said carriers having a slot, and the other having a projection slidingly entering said slot, means for reciprocating said slide, and means for oscillating said needle carrier, substantially as set forth.

3. A sewing machine of the character described, comprising a curved needle, an oscillatory carrier therefor, a curved awl, an oscillatory carrier therefor, a sliding connection between said carriers whereby they are caused to oscillate synchronously, means for effecting the oscillation of said carriers, independent studs on which said carriers are pivoted, said studs being arranged in axial alinement, a stationary member supporting one of said studs, a movable member supporting the other of said studs, and means for actuating the last-mentioned member to move the stud supported thereby axially with relation to the other stud.

4. In a sewing machine, a frame, a rectilinearly movable slide on said frame, independent alined studs on said frame and said slide, a power shaft, power-transmitting means actuated by said shaft by which said slide is reciprocated to move one of said studs toward and from the other, an awl, a needle, an awl carrier pivoted on the movable stud, a needle carrier pivoted on the other stud, a pin on one carrier in sliding engagement with the other carrier, an eccentric rod connected with one of said carriers, and an eccentric on said power shaft operatively engaged with said eccentric rod.

5. A sewing machine of the character described, comprising two supports one of which is movable relatively to the other, a needle carrier arranged to oscillate on one of said supports, an awl carrier arranged to oscillate on the other one of said supports, the axes of said carriers being parallel, means for reciprocating one of said supports to impart lateral feeding movement to the carrier thereon, means arranged to impart oscillatory movement to one of said carriers, and means connecting said carriers for transmitting oscillatory movement from one to the other.

6. A sewing machine of the character described, comprising a curved needle, an oscillatory needle-carrier, a shuttle race, a hooked rotary shuttle in said shuttle race, means for effecting two rotations of the shuttle for each oscillation of the needle, and means on the needle-carrier for bodily moving the shuttle race and the shuttle therein to an inactive position on each alternate rotation thereof.

7. In a shoe sewing machine of the character described, the combination of a curved needle, an oscillatory carrier therefor, a hooked shuttle rotatable on an axis transverse to the axis of the oscillatory carrier, a shuttle race movable at an angle to the axis of rotation of said shuttle, means for effecting two rotations of the shuttle for each oscillation of the needle, and means for moving the shuttle race and shuttle to an ineffective position on each alternate rotation thereof.

8. In a shoe sewing machine of the character described, the combination of a curved needle, an oscillatory carrier therefor, a hooked shuttle rotatable on an axis transverse to the axis of the oscillatory carrier, a shuttle race movable at an angle to the axis of rotation of said shuttle, means for effecting two rotations of the shuttle for each oscillation of the needle, and means consisting of a cam on the needle carrier for moving the shuttle race and shuttle to an ineffective position on each alternate rotation thereof.

9. A sewing machine of the character described, comprising a curved needle, an oscillatory carrier therefor, a power shaft having connections with said needle-carrier for oscillating it, a shuttle carrier pivoted upon said power-shaft, connections between said shuttle and said power-shaft and comprising an intermediate shaft on said carrier for effecting two rotations of the said shuttle for each rotation of the power shaft, and means for moving said shuttle carrier to place the shuttle on each alternate rotation thereof in an inactive position with relation to the needle.

10. A machine of the character described, comprising a rotary shuttle, a power shaft, a shuttle carrier pivoted upon the power shaft and movable thereabout to move the shuttle to an ineffective position, means actuated by said power shaft for rotating the shuttle, and means actuated from the power shaft for oscillating the shuttle carrier.

11. A sewing machine of the character described, comprising a curved needle, means for operating the needle, an arm having a shuttle race on the end thereof, a shuttle operating shaft journaled on said arm, means for oscillating said arm and means for rotating the shuttle, substantially for the purpose specified.

12. A sewing machine of the character described, comprising a curved needle, means for operating the needle, a power shaft, an arm journaled on the power shaft and carrying a shuttle race, a shuttle in said race, intermediate connections between the shuttle and said power shaft, including a shuttle driving shaft on said arm and spiral gears between said shuttle driving shaft and the power shaft, and means for oscillating said arm at each alternate rotation of the shuttle.

13. A sewing machine of the character described comprising an oscillatory needle carrier, a pivot stud therefor, an oscillatory awl carrier, a pivot stud for the awl carrier, means for moving one of said studs toward and from the other, means for oscillating one of said carriers about its stud, and means connecting said carriers for preserving fixed oscillative relation of said carriers one to the other.

14. A sewing machine of the character described, comprising an oscillating needle carrier, a pivot stud therefor, an oscillating awl carrier, a pivot stud for the awl carrier, means for moving one of said studs toward and from the other, means for oscillating one of said carriers about its stud, and means for transmitting from one of said carriers to the other oscillatory motion through an arc which is commensurate with that of the carrier from which the motion is transmitted.

In testimony whereof I have affixed my signature, in presence of two witnesses.

HARRIE A. BALLARD.

Witnesses:
J. L. O'NIELL,
J. P. DEXTER.